June 22, 1937.                A. MOSER                2,084,862
FLANGE COUPLING ARRANGEMENT
Filed Nov. 11, 1936
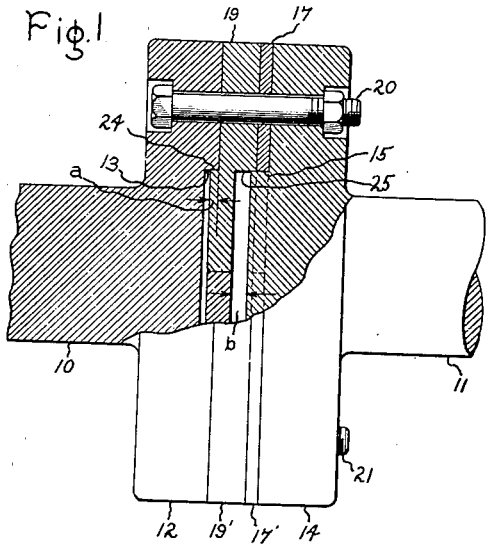
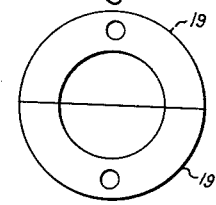
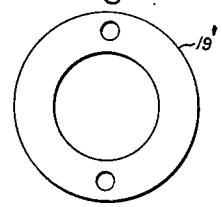
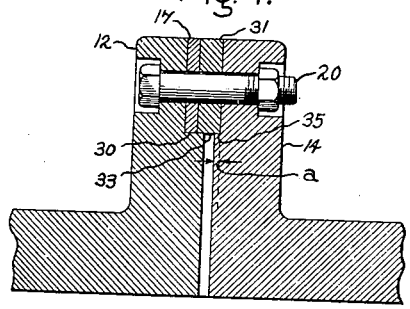
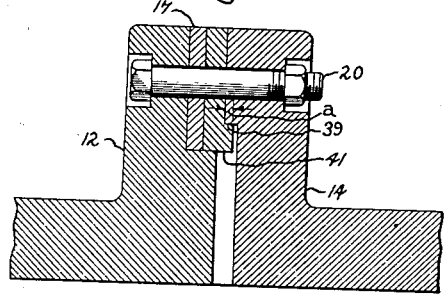
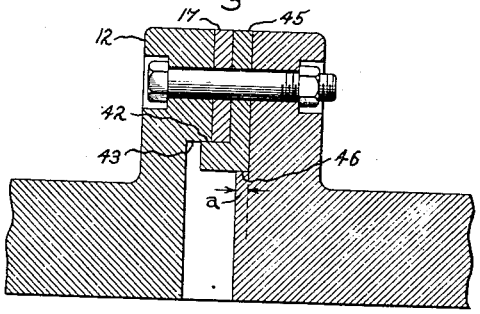
Inventor:
Alexander Moser,
by Harry E. Dunham
His Attorney.

Patented June 22, 1937

2,084,862

UNITED STATES PATENT OFFICE 2,084,862

FLANGE COUPLING ARRANGEMENT

Alexander Moser, Berlin-Reinickendorf-Ost, Germany, assignor to General Electric Company, a corporation of New York Application November 11, 1936, Serial No. 110,365
In Germany December 12, 1934

8 Claims. (Cl. 287—129)

This application is a continuation-in-part of my application for Flange coupling arrangements, Serial No. 42,253, filed September 26, 1935.

The present invention relates to shaft coupling arrangements in which two machines are connected together by means of a pair of flange coupling halves secured to the shafts of the two machines and joined in fixed cooperative relation by suitable securing means. In arrangements of this kind, it is often desirable to operate only one of the machines or to operate the two machines independently. To this end it is necessary with the ordinary flange coupling arrangement to remove at least one-half of the coupling in order to avoid rubbing and consequent friction losses between the two coupling halves.

An object of the present invention is to provide an improved shaft coupling arrangement whereby it is no longer necessary completely to disassemble the coupling when independent operation of the machines is desired.

This is accomplished in accordance with my invention by the provision of a flange coupling which includes spacing and centering means interposed between the coupling halves and joined thereto by bolts or other removable securing means. The spacing means is in a form which permits its radial removal from the coupling arrangement after removal of the coupling bolts, and the centering means may be disengaged from one of the coupling halves after the removal of the spacing means.

The features of novelty which I desire to protect herein will be pointed out with particularity in the appended claims. The invention itself will best be understood upon reference to the following description taken in connection with the accompanying drawing, in which Fig. 1 illustrates a sectional view of a coupling arrangement constructed in accordance with my invention, Fig. 2 is a side view of the centering means of Fig. 1, Fig. 3 represents an alternative form of the centering means, and Figs. 4, 5 and 6 are sectional views illustrating various modifications of which my invention is capable.

Referring particularly to Fig. 1 I have shown two shaft sections having spaced shaft ends 10 and 11 arranged in adjoining relation. Each shaft end is provided with a flange coupling half which in the present instance is shown as being fixedly secured to the shaft itself and as being provided with an axially extending centering surface. More specifically, a first coupling half 12 is secured to the shaft 10 and is provided with an inwardly facing centering surface 13 while a second coupling half 14, which is joined to the shaft 11, carries an outwardly facing centering surface 15. In order to retain the shaft ends in proper spacing and alinement, there is provided a spacing member, a centering member 19, and removable means, represented as bolts 20 and 21, for retaining the coupling halves in fixed cooperative relation with the spacing and centering members. The spacing member may suitably comprise a ring having at least two radially removable spacing segments 17 and 17' while the centering member 19 constitutes a disk provided with outwardly and inwardly facing centering surfaces 24 and 25 engaging the corresponding opposed surfaces of the coupling halves. In particular, the outwardly facing surface 24 is provided by a shoulder formed on a projecting portion of the disk 19 while the surface 25 represents the bounding wall of a recess set into the opposite side of the disk.

In order to permit the coupling halves to be readily disengaged upon the removal of the securing bolts 20 and 21, the dimensions of the spacing and centering members should be properly correlated. Thus, the thickness of the ring segments 17 and 17' should be greater than the axial extent $a$ of the mutually engaging surfaces of the centering member 19 and the coupling half 12. With these conditions fulfilled, radial removal of the spacing segments 17, 17' will permit axial movement of the disk 19 completely to disengage the coupling half 12 provided the depth of the free space $b$ in the bottom of the recess bounded by the surface 25 is sufficient to accommodate such movement.

If desired, the centering member may be constituted of two or more separable segments 19 and 19', as indicated in Fig. 2, so that the axial movement above referred to permits subsequent radial withdrawal of these segments from the coupling arrangement. In order to simplify as much as possible the manufacture of the coupling parts, however, I prefer in certain cases to have the centering member formed as an integral piece as indicated in Fig. 3. While this form does not, with the arrangement indicated, permit the complete withdrawal of the centering member, it does permit a complete disengagement of that member from the coupling half 12 and a resultant independent rotation of the shafts 10 and 11. During such rotation the coupling member may be retained in position for re-assembly of the coupling by engagement between the surfaces 15 and 25.

In Fig. 4, in which parts corresponding to those already described are similarly numbered, I have illustrated a modification of the invention. In this figure, as in that previously described, a removable spacing member is provided in the form of a separable ring 17 which rides on an outwardly facing centering surface 30 formed on the coupling half 12. In this case centering of the shaft is accomplished by a ring-shaped centering member 31 which may be either segmental or unitary in form and which is provided with an inwardly facing centering surface 33. This surface engages with a portion of the surface 30 and with a similarly disposed surface 35 formed on the face of the coupling half 14. As in the case previously described, the thickness of the ring 17 is greater than the distance a which measures the axial extent of the mutually engaging portions of the surfaces 33 and 35. Consequently, removal of the member 17 permits an axial movement of the ring 31 completely to disengage the coupling half 14.

In the further modification of Fig. 5, the centering member is again indicated as being of ring shape but is provided with an outwardly facing centering surface 39 in addition to the inwardly facing surface 41 which latter engages the coupling half 12. It will be apparent that as in the constructions previously described the distance a is chosen less than the thickness of the removable spacing member 17 so that the disengagement of the coupling parts may be readily accomplished upon the removal of the bolt 20 and the remaining elements of the securing means. It should be understood in connection with this modification, as well as that of Fig. 4, that the centering member may optionally be of separable or integral form as understood in Figs. 2 and 3 respectively.

The arrangement of Fig. 6 resembles that described in connection with Fig. 5, except that the outwardly facing centering surface 42 is of sufficient axial extent so that it engages and supports the removable spacing member 17 as well as engaging the centering surface 43 formed on the coupling half 12. As before, removal of the spacing member permits sufficient axial movement of the ring 45 to disengage it from the centering surface 46.

While I have shown particular embodiments of my invention, it will be understood by those skilled in the art that many modifications may be made without departing from the invention, and I aim by the appended claims to cover all such modifications as fall within the true spirit and scope of the invention.

What I claim as new and desire to secure by Letters Patent of the United States is:

1. A coupling arrangement including the combination of a first shaft, a coupling half secured to the first shaft and having a centering surface thereon, a second shaft, another coupling half secured to the second shaft and having another centering surface thereon, a centering member having centering surfaces respectively engaging the corresponding centering surfaces of the coupling halves, a spacing member interposed between the centering member and one of the coupling halves, and removable means securing the coupling halves in fixed cooperative relation with the centering and spacing members, said spacing member being radially removable from said coupling arrangement except for the action of said securing means, and said centering members being axially movable completely to disengage one of said coupling halves except for the presence of said spacing member.

2. A shaft coupling arrangement including first and second adjoining shaft ends, each shaft end having an axially extending centering surface, a disk having a centering surface on each side engaging the corresponding surfaces of the shaft ends, removable spacing means comprising a plurality of separable parts interposed between the disk and the first shaft end and removable means securing the shaft ends in fixed cooperative relationship with the disk and spacing means, the thickness of the spacing means being greater than the axial extent of the mutually engaging surface portions of the disk and said second shaft end whereby removal of the securing and spacing means permits axial movement of the disk completely to disengage the disk from the second shaft end.

3. A coupling arrangement including the combination of a first shaft, a coupling half secured to the first shaft and having an inwardly facing centering surface thereon, a second shaft, another coupling half secured to the second shaft and having an outwardly facing centering surface thereon, a centering member provided on opposite sides with an inwardly facing and an outwardly facing centering surface engaging the correspondingly opposed centering surfaces of the coupling halves, a spacing member interposed between the centering member and one of the coupling halves and removable means securing the coupling halves in fixed cooperative relationship with the centering and spacing members, said spacing member being freely removable from the coupling arrangement except for the action of said securing means and said centering member being axially movable completely to disengage one of the coupling halves except for the presence of said spacing member.

4. A flange coupling arrangement including the combination of a first shaft, a coupling half secured to the first shaft and having a centering surface thereon, a second shaft, another coupling half secured to the second shaft and having another centering surface thereon, a centering member having centering surfaces respectively engaging the corresponding centering surfaces of the coupling halves, a spacing member comprising at least two segments interposed between the centering member and one of the coupling halves, the thickness of said spacing member being greater than the axial extent of the mutually engaging surface portions of the centering member and the other of the coupling halves, and bolts uniting the coupling halves projecting through openings in the coupling halves and said spacing and centering members, removal of the bolts permitting radial removal of the spacing member segments and subsequent axial movement of the centering member to disengage the same from said other of the coupling shafts.

5. A coupling arrangement including the combination of a first shaft, a coupling half secured to the first shaft and having a centering surface thereon, a second shaft, another coupling half secured to the second shaft and having another centering surface thereon, a disk having a centering surface on each side engaging the corresponding centering surfaces of the coupling halves, a spacing member comprising at least two segments interposed between the disk and one of the coupling halves, and removable means securing the coupling halves in fixed cooperative relationship with said disk and said spacing member, removal of said means permitting removal of the spacing member segments and subsequent axial movement of the disk completely to disengage the disk from one of the coupling halves without displacement of either coupling half.

6. A coupling arrangement including a first and a second of coupling halves respectively having an inwardly and an outwardly facing centering surface, a centering member having outwardly and inwardly facing surfaces respectively engaging the correspondingly opposed surfaces of the coupling halves, a separable, radially-removable spacing ring interposed between the centering member and the first coupling half and having a surface engaging the outwardly facing surface of the centering member, and removable means joining the coupling halves in fixed cooperative relation with the spacing ring and centering member, the axial thickness of the spacing ring being greater than the axial length of the centering surface of the second coupling half.

7. A coupling arrangement including first and second coupling halves each provided with an axially extending centering surface thereon, a disk comprising at least two segments and having centering surfaces engaging the corresponding surfaces of the coupling halves, a radially removable spacing member interposed between the disk and the first coupling half, and means securing said coupling halves in fixed cooperative relation with the disk and the spacing member, the thickness of the spacing member being greater than the axial extent of the mutually engaging surface portions of the disk and said second coupling half whereby removal of the securing means and spacing member permits axial movement and radial withdrawal of the segments of said disk.

8. A flange coupling arrangement including the combination of a first shaft, a coupling half having a centering surface secured to the first shaft, a second shaft, another coupling half having another centering surface secured to the second shaft, a disk comprising at least two segments having a centering surface on each side engaging the corresponding centering surfaces of the coupling halves, a ring comprising at least two segments interposed between the disk and one of the coupling halves, and bolts uniting the coupling halves projecting through openings in the coupling halves, the disk and the ring, removal of the bolts permitting radial removal of the ring segments, and removal of the ring segments permitting axial movement and radial removal of the disk segments.

ALEXANDER MOSER.